No. 848,176. PATENTED MAR. 26, 1907.
O. F. JORDAN.
NUT RETAINER FOR VEHICLE AXLES.
APPLICATION FILED FEB. 26, 1906.
Fig. 1.
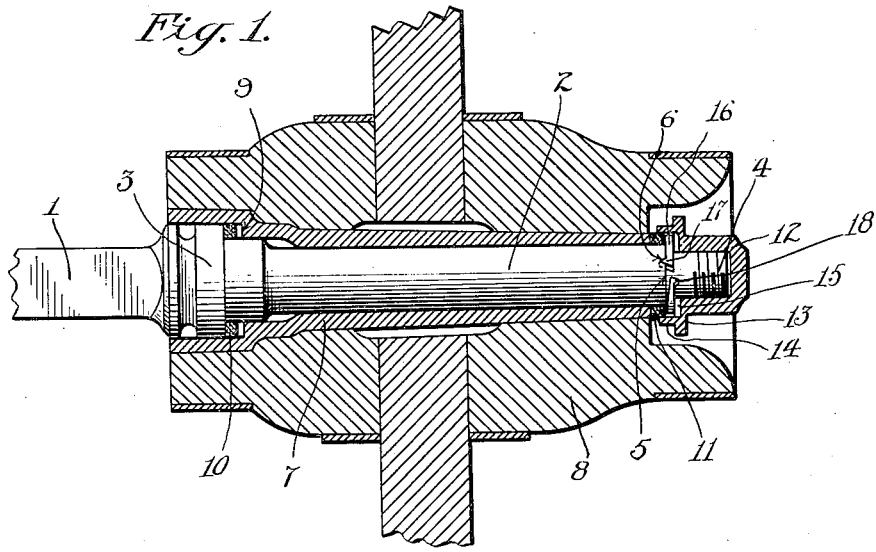
Fig. 2. Fig. 3. Fig. 4.
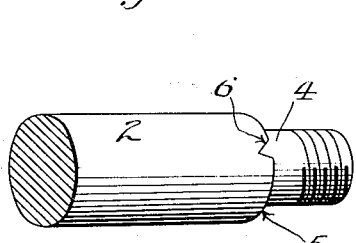 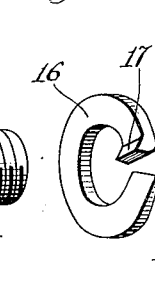 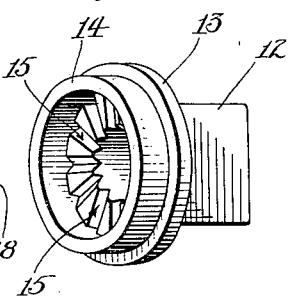
Fig. 5.
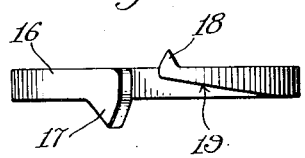
Witnesses:
Frank L. Graham
Boll Hall
Inventor:
Oric F. Jordan.
By Townsend Lyon Hackley & Knight
His Attys.

UNITED STATES PATENT OFFICE.

ORIE F. JORDAN, OF LOS ANGELES, CALIFORNIA.

NUT-RETAINER FOR VEHICLE-AXLES.

No. 848,176.

Specification of Letters Patent.

Patented March 26, 1907.

Application filed February 26, 1906. Serial No. 302,894.

*To all whom it may concern:*

Be it known that I, ORIE F. JORDAN, a citizen of the United States, residing at Los Angeles, in the county of Los Angeles and State of California, have invented a new and useful Nut-Retainer for Vehicle-Axles, of which the following is a specification.

This invention relates to vehicle-axle construction, and particularly to the nut-retaining feature.

The objects of the invention are to provide a device of the character described which is simple in construction, effective in operation, and durable in use.

Another object is to hold the nut from turning accidentally, and yet permit the nut to be readily turned on or off when desired.

Another object is to provide for end play of the axle-box without interfering with the attachment of the nut or loosening it in any way.

Other objects will be brought out in the following description.

The accompanying drawings illustrate the invention, and referring thereto—

Figure 1 is a sectional view taken diametrically through the hub and axle-box of a vehicle, illustrating the invention, the axle or spindle being shown in elevation. Fig. 2 is a perspective view of the end of the axle. Fig. 3 is a perspective view of the spring-detent. Fig. 4 is a perspective view of the nut. Fig. 5 is an elevation, enlarged, of the spring-detent.

1 designates the axle, having the bearing-spindle 2, with grooved flange 3 of the usual construction. The end of the spindle has a threaded stud 4, forming a shoulder 5, the shoulder 5 having a radial V-shaped notch 6. Mounted on the spindle 2 is the axle-box 7, upon which is mounted the hub 8, the axle-box 7 having an internal shoulder 9, there being a leather washer 10 around the spindle 2 between the shoulder 9 and the flange 3. The outer end of the axle-box 7 terminates short of the shoulder 5 of the spindle 2, and mounted on the end of the spindle 2 and adapted to bear against the outer end of the axle-box 7 is a washer 11, preferably of leather. The external diameter of the washer 11 is equal to the external diameter of the outer end of the axle-box 7, so that the outer face of the washer is substantially flush with the face of the axle-box.

A hollow nut 12 is screwed to the stud 4, the nut 12 having a flange 13 and a concentric flange 14, which projects over the washer 11 and forms a housing for the retaining devices. The face of the flange 13 in the interior of the flange 14 is provided with radial serrations 15. A portion of the stud 4 adjacent the shoulder 5 is plain and smooth, being free from threads, and encircling the smooth portion of the stud 4 is a circular spring-detent 16, having a sharp wedge-shaped lug 17, which engages the V-notch 6 of the axle-box 2 and which also has an oppositely-facing wedge-shaped lug 18 on the other end, which is adapted to engage with any of the serrations 15 of the nut. The end of the spring-retainer 16 which carries the lug 18 is tapered at 19, as clearly shown in Fig. 5, in order to give room for the tapered portion to spring back when the lug 18 is forced out from engagement with a serration 15 when the nut 12 is turned with sufficient force, thus making it possible to screw the nut up until the outer edges of the serrations come into very close contact with the adjacent face of the spring-retainer, the amount of metal being removed by tapering the end of the spring-retainer being at least equal to the projecting distance of the lug 18.

It will be observed by referring to Fig. 1 that the outer face of the spring-retainer lies against the adjacent edges of the serrations, so that the spring-retainer is held against longitudinal movement between the nut and the shoulder 5, and that if the nut is turned in either direction the inclination of the tooth or serration which engages the lug 18 will spring that end of the spring-detent toward the shoulder 5, thus disengaging the lug from the serration and allowing the nut to be turned off, the serrations 15 clicking over the lug 18 with gradually-diminishing spring effect until unscrewed sufficiently so that the outer edges of the serrations escape the lug 18 when the latter is sprung out in normal position. The external diameter of the spring-retainer 16 is but slightly less than the external diameter of the washer 11, and therefore the outer part of the lug 17, or that portion of it which projects outward radially from the notch 6, will engage or bite into the washer 11, and thus hold the latter from turning. The washer 11 takes the outer thrust of the axle-box 7 when the wheel chucks, and thus absorbs considerable of the vibration which otherwise would be imparted to the nut and threaded stud 4. The washer 10 takes the inward thrust when the wheel chucks.

It is apparent that the nut 4 is positively held against unscrewing until sufficient rotative force is applied to it to cause the spring-detent to yield to disengage the lug 18. The hub has no direct contact with the nut, nor does the axle-box 7, the latter contacting with the washer 11, and as the washer 11 is held from rotation by the lug 17 there is no rotative friction imparted to the nut, and thus it cannot accidentally unscrew or lose off. I consider this elimination of rotative friction against the nut a most important one, and therefore the engagement of the lug 17 with the washer 11 is a most important and valuable feature.

What I claim is—

1. In a device of the character described, a spindle having a threaded stud, an axle-box on the spindle, the outer end of the axle-box terminating short of the spindle end, the end of the spindle having a notch, a hollow nut screwed on the stud, the nut having internal radial serrations, a circular spring-detent surrounding the stud and having a lug which engages a serration of the nut, and a washer on the spindle end between the spring-detent and outer end of the axle-box, the spring-detent having a lug which engages the notch in the spindle end and also the washer.

2. In a device of the character described, a spindle having a threaded stud, an axle-box on the spindle, the outer end of the axle-box terminating short of the spindle end, the end of the spindle having a notch, a hollow nut screwed on the stud, the nut having internal radial serrations, a circular spring-detent surrounding the stud and having a lug which engages a serration of the nut, and a washer on the spindle end between the spring-detent and outer end of the axle-box, the spring-detent having a lug which engages the notch in the spindle end and also the washer, the spring-detent having a tapered end which permits the nut to be screwed up flat against the face of the detent and yet allows the tapered end of the detent to spring back when the nut is turned and forces the detent-lug out of engagement with a serration.

In testimony whereof I have hereunto set my hand, at Los Angeles, California, this 19th day of February, 1906.

ORIE F. JORDAN.

In presence of—
F. M. TOWNSEND,
VERNA A. TALBERT.